United States Patent [19]

Auer et al.

[11] Patent Number: 4,725,694

[45] Date of Patent: Feb. 16, 1988

[54] COMPUTER INTERFACE DEVICE

[75] Inventors: Carol M. Auer, Middletown, N.J.; Daniel L. Castagno, Pickerington; Allen W. Haley, Jr., Columbus, both of Ohio; Harry H. Moore, IV, Lincroft, N.J.; Sean E. O'Leary, Eatontown, N.J.; Steven J. Paley, Aberdeen, N.J.; Thomas E. Rutt, Asbury Park, N.J.

[73] Assignee: American Telephone and Telegraph Company, AT&T Bell Laboratories, Murray Hill, N.J.

[21] Appl. No.: 862,629

[22] Filed: May 13, 1986

[51] Int. Cl.[4] .................. G08C 21/00; G02F 1/13; G06K 15/18
[52] U.S. Cl. ........................................ 178/18; 340/712
[58] Field of Search ............ 178/18, 19; 340/365 VL, 340/784, 711, 712

[56] References Cited

U.S. PATENT DOCUMENTS 4,224,615 9/1980 Penz .................................. 340/712

OTHER PUBLICATIONS

Article entitled "Ulticare puts a terminal in every patient room to save millions in nursing costs" Hospitals, Jan. 1, 1985, p. 85.

Primary Examiner—Stafford D. Schreyer
Attorney, Agent, or Firm—Robert O. Nimtz; Henry T. Brendzel

[57] ABSTRACT

A computer terminal device includes a flat screen display element and a touch-sensitive element. Simulated keyboards can be displayed on the display element and, in response to the touching of the simulated keys, generate appropriate control signals. The same flat screen display can also be used to display computer output, either the result of calculations or the result of information retrieval requests. The slim silhouette of this terminal makes it ideal for hostile environments such as the factory floor or the hospital room.

4 Claims, 9 Drawing Figures

10:30
NAME: MACOLL, DOROTHY
AGE: 58
STATUS: D
TIME DUE: 10:00

DOCUMENT VITALS

ATTENDING M.D.: A. B. BASKIN

REASON: _______________

MRN: 2313234
LOCATION: 512-4

| ☐ TIME DONE 10:01 | ☐ TEMP 98.5 deg F | ☐ TEMP SITE ******* | ☐ WGT ____ lbs |
| ☐ PULSE 112/MIN | ☐ PULSE SITE ******* | ☐ RESP 20/MIN | ☐ WGT ____ kg |
| ☐ BP 130/80 | ☐ BP SITE ******* | ☐ BP POSITION ********** | |

[SAVE] [PREV] [NEXT] [CALC] [ ] [ ] [DETAIL]
[LOGOFF] [MENU <-] [CONTINUE] [<---] [ ] [ ]

COMPUTER INTERFACE DEVICE

TECHNICAL FIELD

This invention relates to computers and computer terminals, and more particularly, to small, compact and light-weight terminal devices for computers and computer systems.

BACKGROUND OF THE INVENTION

Flat display electroluminescent and plasma display devices are well-known and have long been incorporated into computer terminal devices, particularly for portable terminals and for portable computers. Such portable computers are sometimes called "smart" terminals or personal computers or work stations. While such flat screen devices substantially reduce the size of computer terminals, the standard keyboard, key pads, "mice," and other input devices have required that even "portable" terminals be relatively bulky despite the thin screen display.

It is also well-known to provide a touch-sensitive display screen for computer terminals. By touching the screen at or near indicia displayed on the screen, the user can select actions or graphic display portions for further consideration or action. Thus, in response to a touch, a command can be selected from a menu for execution, a graphical element can be selected for enlargement, movement or replication, or a data file can be selected for processing. Such touch-responsive selections have the disadvantage, however, of being totally dependent on the specific application for which they were designed. General purpose input devices, such as typewriter-type keyboards, were therefore also necessary for generalized inputting.

SUMMARY OF THE INVENTION

In accordance with the illustrative embodiment of the present invention, a light, portable, compact computer terminal is provided by combining a flat screen display device with a touch-sensitive overlayer. All or a portion of the display surface is used to simulate a standard input device such as a standard "q-u-e-r-t-y" typewriter keyboard or a touch-tone numerical telephone keypad. Simultaneously with the display of the simulated input device, the areas of the display corresponding to specific signals (alphanumerics, for example) are correlated with the generation of the corresponding signals, ASCII codes, for example.

It can be seen that a touch-sensitive screen in accordance with the present invention can serve all of the input and output needs of a computer terminal. A programmed microprocessor associated with the terminal can be used to provide the screen displays and generate the appropriate signals in response to touching the corresponding selected portions of the screen. Such a device can be considerably more compact than heretofore available computer terminals. True portability of a computer terminal in accordance with the present invention, particularly in a busy, and sometimes hostile, work environment, permits such a terminal to be used as an electronic clipboard, but with all of the processing power of a large computer.

In accordance with one feature of the present invention, the electronic clipboard terminal can be connected, by wires or by standard wireless technology, to minicomputers or large main frame computers to obtain the advantages of complex computing capability and access to large data bases.

In accordance with another feature of the present invention, the portable terminal can be used to simulate a standard keyboard, a standard telephone key pad, a standard numerical key pad, a stenographic machine, or any other standard finger-operated data input device. Moreover, the same screen which is used as a simulated input device can also be used as a standard output or display device, either at different times or at different locations ("windows") on the display surface. Finally, such versatility is entirely under the control of software in a digital computer and hence can be called upon automatically in response to computer-derived signals. In this way, a standard simulated keyboard is displayed only at those times when alphabetic input is appropriate, a numerical key pad is displayed only when numeric input is appropriate, a telephone key pad is displayed only when a telephone number must be supplied, and so forth.

DETAILED DESCRIPTION

Figure 1:
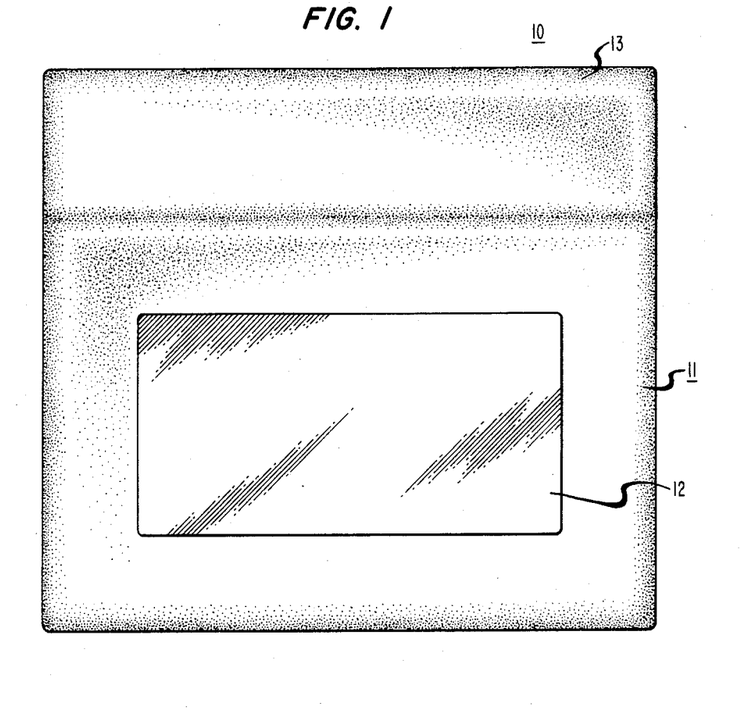
FIG. 1 is a plan view of a computer terminal in accordance with the present invention.
Figure 2:
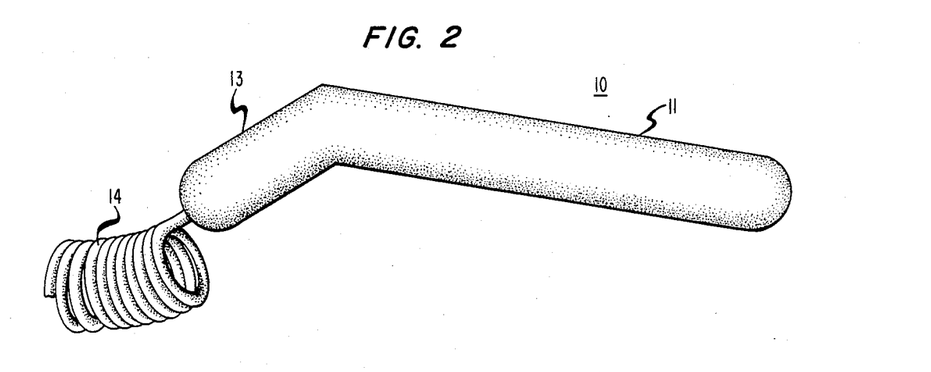
FIG. 2 is a side view of the computer terminal of FIG. 1.

Referring more particularly to the drawings, FIGS. 1 and 2 are plan and elevation views, respectively, of a portable computer terminal in accordance with the illustrative embodiment of the present invention. As can be seen in FIG. 1, the terminal 10 has two planar surfaces 11 and 13 at an angle to each other. Planar surface 11 includes an opening 12 which provides visual access to a flat screen display divice inside of terminal 1. As can best be seen in FIG. 2, the planar surfaces 11 and 13 define an angle of approximately 140 degrees therebetween. A retractile cord 14 may be attached to terminal 10 as means for connecting terminal 10 to computing facilities outside of terminal 10, should that be necessary or desireable. Alternatively, terminal 10 can be electrically coupled to such external computing facilities by well-known wireless technology using ultrasonic sound waves, radio waves, infra-red waves or other wireless media.

Figure 3:
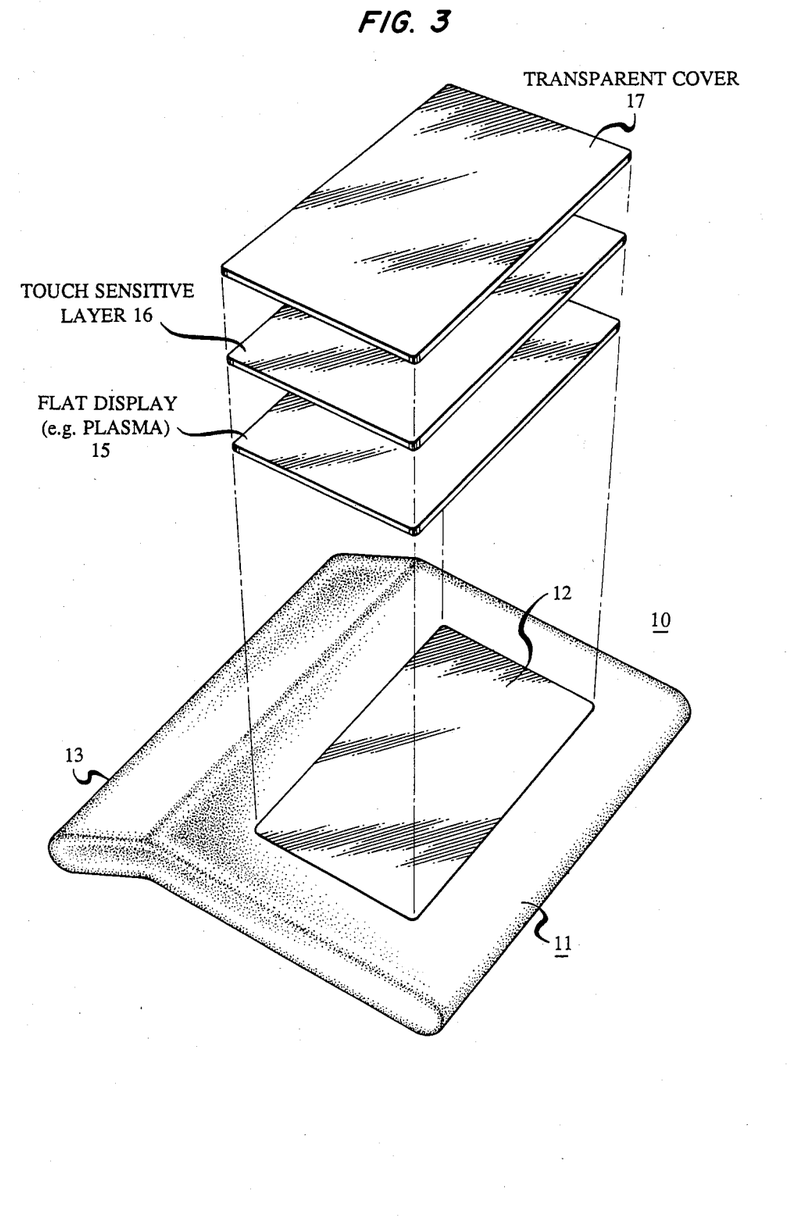
FIG. 3 is an exploded perspective view of the terminal of the present invention showing the construction of the multilayer screen.

In FIG. 3, there is shown an exploded view of portions of the terminal 10 to illustrate the construction of the display screen elements which fit into opening 12 of surface 11. This display area comprises a flat electroluminescent or plasma display screen 15, a touch-sensitive layer 16, and a transparent protective layer 17. These three layers are sandwiched together and are visible through the opening 12 on surface 11. Flat screen display devices are well-known in the art and will not be further described here. Not shown in FIG. 3 are the electrical wires and connections required to operate flat display screen 15.

Similarly, touch-sensitive layer 16 is also well-known in the art and will not be further described here. Not shown in FIG. 3 are the electrical wires and connectors required to operate the touch sensitive layer 16. It is sufficient for the present invention that touch-sensitive layer 16 be capable of discriminating between adjacent touched areas of a size commensurate with the size of the human fingertip.

It will be noted that the terminal device 10 is designed to be relatively thin and small for ease in portability. Moreover, the sandwich construction of the display screen assists in the terminal's thin profile and thus makes it possible for the terminal device of the present invention to be used as an electronic clipboard in relatively hostile environments such as the factory floor or the hospital patient's room. The transparent protective layer 17, for example, may be so constructed and so sealed to the surface 11 as to protect components inside of terminal 10 from corrosive or damaging elements in the environment in which terminal 10 is used.

In accordance with the present invention, the terminal 10 operates as both an input and an output device for a computer which may comprise a microprocessor included inside of the case of terminal 10 or which may comprise a separator computer to which terminal 10 is connected. The connection between terminal 10 and such a computer can be had by way of retractor cord 14 (to permit relative mobility of terminal 10) or by a wireless connection such as is commonly found in home entertainment units using wireless remote control devices. In any event, and in accordance with the present invention, the terminal 10 includes a display surface 20 on which there can be displayed a plurality of diverse keyboard simulations. The touch-sensitive layer 16 is then used to identify the various key areas of such displayed keyboards and to generate appropriate electrical signals in response to the touch of each of the graphically defined key areas. This capability permits the terminal 10 to operate as if it included a plurality of different mechanical keyboards. Indeed, and in further accordance with the present invention, different varieties of simulated keyboards can be displayed on surface 20, depending on the particular needs of the user.

Figure 4:
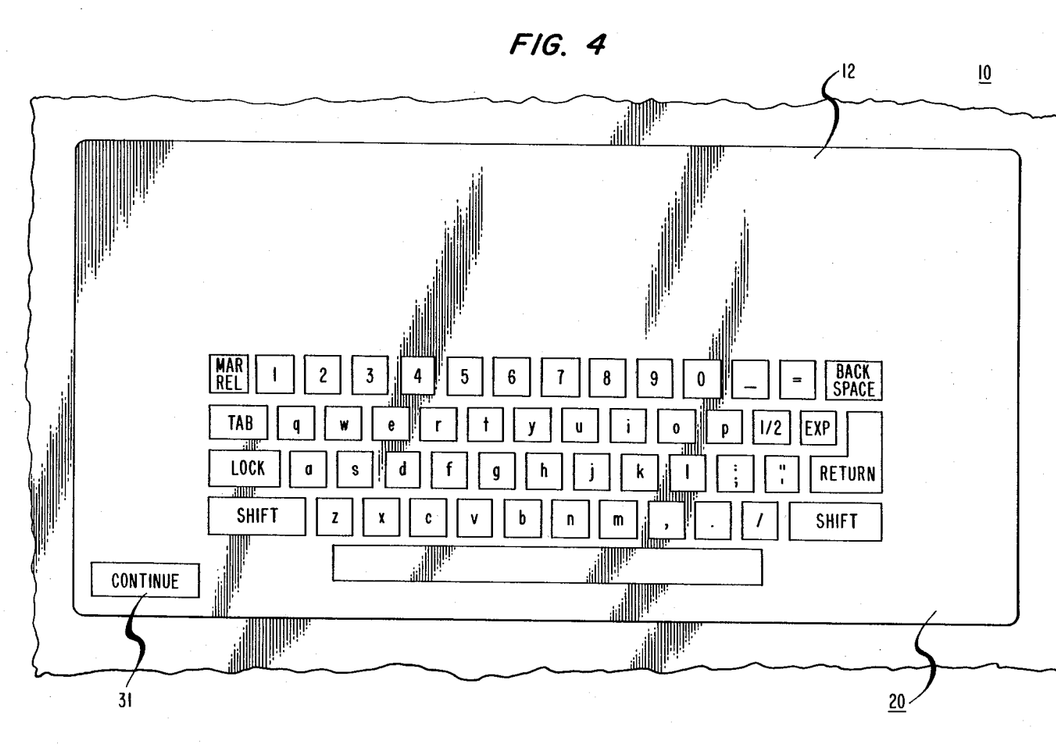
FIG. 4 is a graphical representation of a standard typewriter keyboard display for use with the terminal of the present invention.
Figure 5:
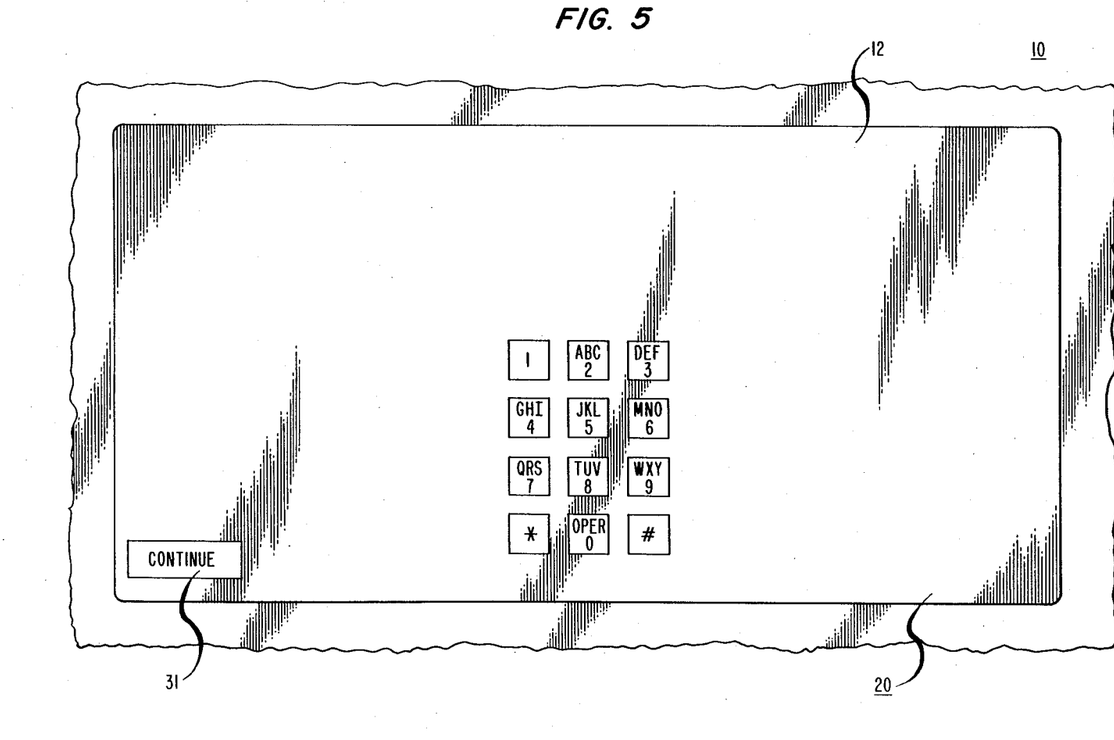
FIG. 5 is a graphical representation of a telephone key pad display for use with the terminal of the present invention.

One example of such a simulated keyboard is shown in FIG. 4, where there is shown a display of a standard typewriter keyboard which can be used as an input device for standard alpha-numeric characters for inputting standard text. The keyboard display of FIG. 4 may also be used for standard text processing chores such as editing. In the alternative, and as shown in FIG. 5, the display surface 20 may be used to display a standard telephone key pad which can be used to establish telephone connections with remote computers or remote data bases when desired by the user of terminal 10. Finally, and as illustrated in FIG. 6, the terminal 10 may have displayed in display area 20 keys which are totally dependent on the particular application for which the terminal 10 is used.

Figure 6:
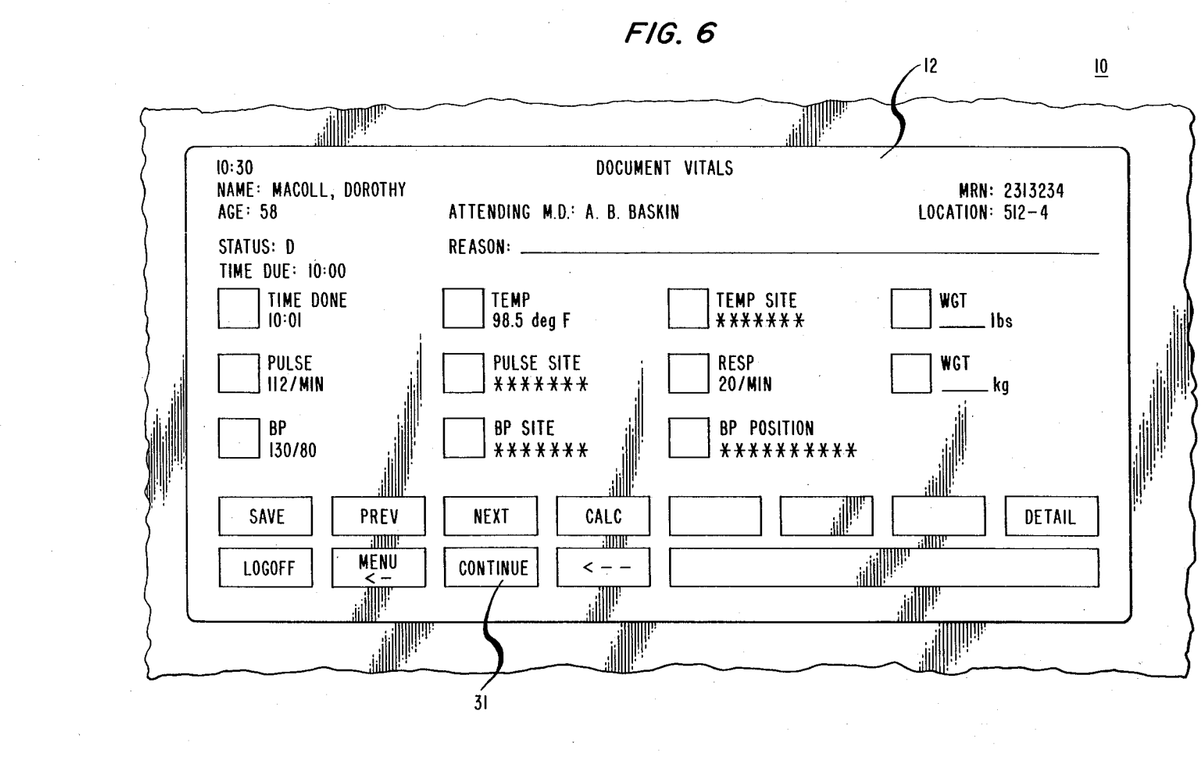
FIG. 6 is a graphical representation of a display for a special application of the terminal of the present invention in the hospital environment.

In FIG. 6, for example, there is shown a display suitable for a terminal 10 used in a hospital room environment where it is necessary to collect and record the vital signs for a particular patient. Across the top of the display of FIG. 6 appears identifying information concerning the particular patient. Also included in FIG. 6 are a plurality of key areas which the user may touch in order to indicate the particular type of data being submitted. Following the touching of one of these keys, a standard numerical keyboard can be displayed for inputting numerical data or a standard typewriter keyboard as shown in FIG. 4 may be displayed for inputting text. Thus, the application-dependent display of FIG. 6 can provide a mechanism for obtaining the use of application-independent input devices (FIGS. 4 and 5) for the collection of specific types of information. Each of the displays shown in FIGS. 4, 5 and 6 include a key 31 labelled "continue." Key 31 is used to return the display to whatever display was present before the current display. Thus, if, during the display of FIG. 6, the user wishes to input text for the "REASON" field near the top of the display of FIG. 6, the keyboard of FIG. 4 will be displayed for text input. Following the text input, the "continue" key 31 of FIG. 4 will be touched, thereby restoring the display of FIG. 6.

Figure 7:
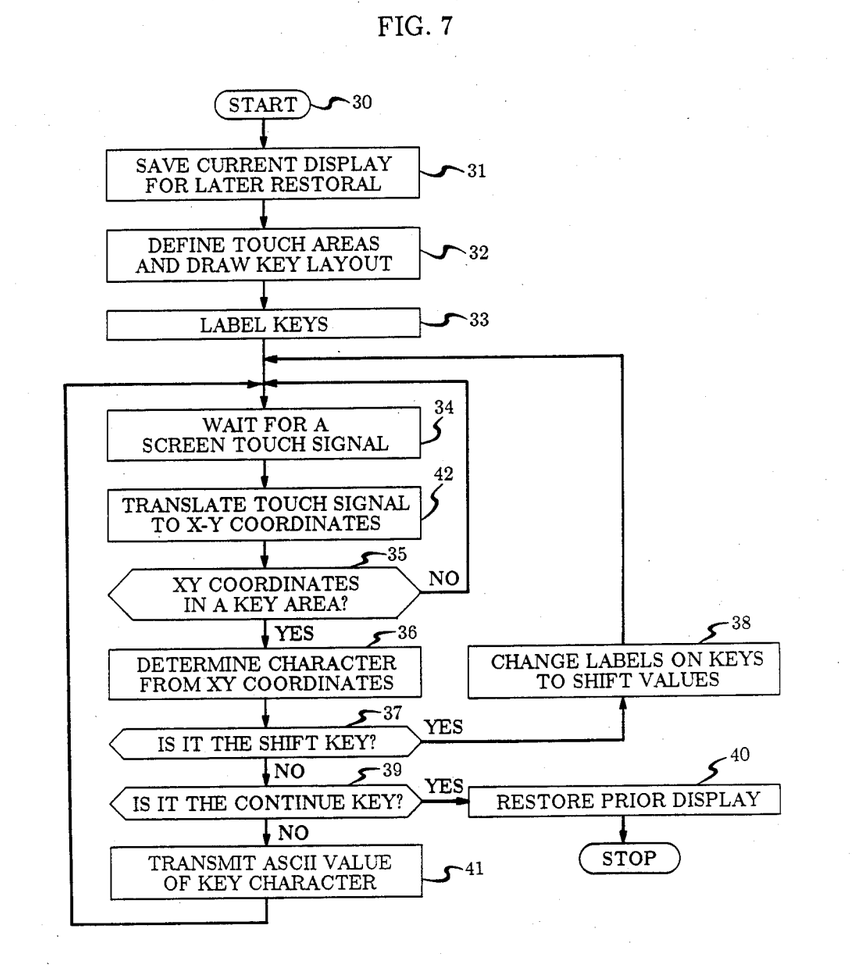
FIG. 7 is a flowchart showing one application of the terminal of the present invention for the generation of standard typewriter alphanumeric ASCII codes to control a computer.

In order to better understand the operation of the terminal 10 of the present invention, the flowchart shown in FIG. 7 will now be discussed. In FIG. 7, there is shown a flow chart of a typical touch-screen keyboard operation. For illustrative purposes, a flowchart of the operation of the typewriter keyboard of FIG. 4 will be described, although the operation of other types of general purpose or application-dependent keying systems will be readily apparent to those skilled in the art from this description.

Turning then to FIG. 7, the keyboard operation starts at start box 30. In box 31, the current display which appears on the screen 20 is stored for later retrieval and restoral after the use of the typewriter keyboard is completed. In box 32, and under software control, the touchscreen areas which are to represent key areas are defined in x and y coordinates, and the visual appearances of the keys are drawn on the flat display screen 15 of FIG. 3. In box 33, the displayed key boxes are labelled with labels appropriate to the particular use of the simulated keyboard. For a typewriter keyboard, the labels shown in FIG. 4 would be appropriate. Of course, for other keyboards, i.e., the telephone key pad of FIG. 5, other labelling arrangements would be used. At box 34, the circuits of terminal 10 simply wait until the touch-sensitive screen 16 of terminal 10 detects the fact that the surface of the screen has been touched. When the screen is touched, box 34 translates the touch-responsive signals from layer 16 into x-y coordinates on the display surface. In decision box 35, the x-y coordinates of the touched point are compared to the predefined x-y coordinates associated with the displayed keys. If the touched point lies outside of all of such predefined key areas, then box 34 is reentered to await another touch-responsive signal.

If the coordinates of the touched point on the screen correspond to a predefined key area, then box 36 is entered to determine the particular character or numeral which that key is intended to generate. In decision box 37, it is determined whether that character corresponds to one of the shift keys on the typewriter display. If so, box 38 is entered to erase the current labels on the keys (as shown in FIG. 4) and replace these labels with labels corresponding to the shifted values of these keys, e.g. capital letter rather than lower case letters. Thus, unlike standard keyboards, it is possible to relabel the keys in a transient manner as key stroking takes place.

Once keys are relabeled in box 38, box 34 is re-entered to await the next touch on the screen surface. If the key touched is not a shift key, then decision box 39 is entered to determine whether or not the continue key 31, shown in FIGS. 4, 5 and 6, was touched. This continue key is utilized in all keyboard displays to permit a return to the immediately preceeding display. Thus, if the continue key was touched, box 40 is entered which deletes the typewriter display and restores the previous display which was saved in box 31. If the continue key was not touched, then box 41 is entered, and the ASCII value of the key that was touched is transmitted to the connected computer or transmission link. Thereafter, box 34 is again re-entered to await the next touch on the touch-sensitive screen.

Figure 8:
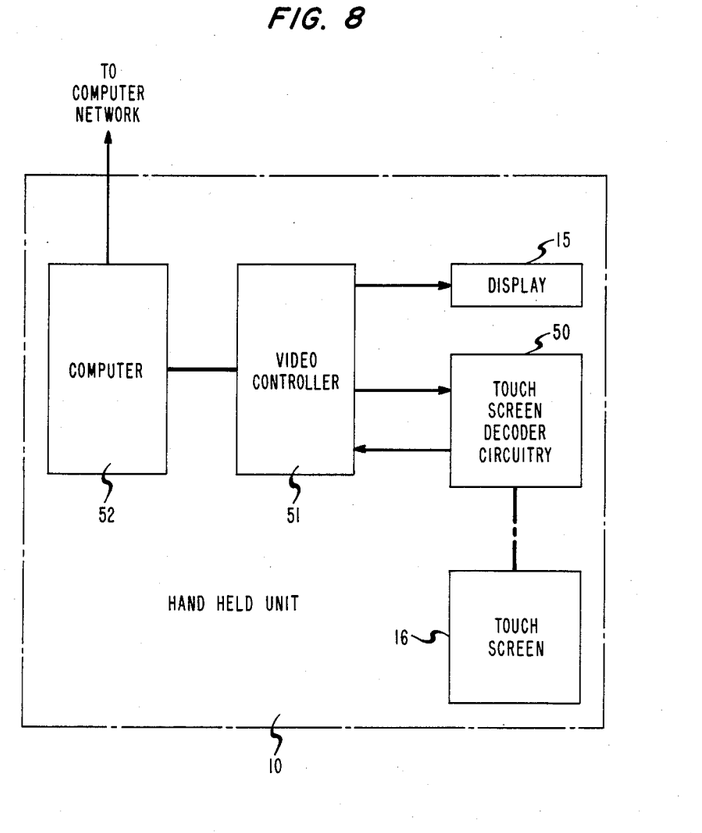
FIG. 8 is a detailed block diagram of the electrical circuits of the terminal of FIGS. 1 through 6.

Referring more particularly to FIG. 8, there is shown a block diagram of the internal circuitry of the terminal 10. The internal circuitry of terminal 10 comprises, among other things, the flat display 15 and the touch-sensitive screen 16. A decoder circuit 50 is responsive to the touch screen 16 and translates the output from touch-sensitive screen 16 (which may well be analog electrical signals) into x-y coordinates. The touch screen decoder circuit, in turn, communicates with the video controller 51 which maintains the keyboard display on display device 15 and compares the x-y coordinates of the touched point to the predefined x-y coordinates of the displayed screen. In response to matches, controller 51 produces ASCII characters which are delivered to a central processor in computer 52.

Video controller 51 and computer 52 may, as illustrated in FIG. 8, be part of the hand-held terminal 10. In the alternative, controller 51 and computer 52 may be remotely located, and a flexible and retractile cord used to connect the portable elements 15, 16 and 50 to the balance of the circuitry. In the alternative, this connection can be had using wireless technology such as sonic, radio or infrared communication links. Indeed, computer 52 might well comprise an entry point to a vast computer network including large amounts of extremely complex computation capability or access to large databases, the contents of which may prove useful in the particular application in which terminal 10 is being used. Thus, terminal 10, although small and simple in itself, can be used as an access mechanism to much larger and much more complex data processing or data retrieval capabilities.

Figure 9:
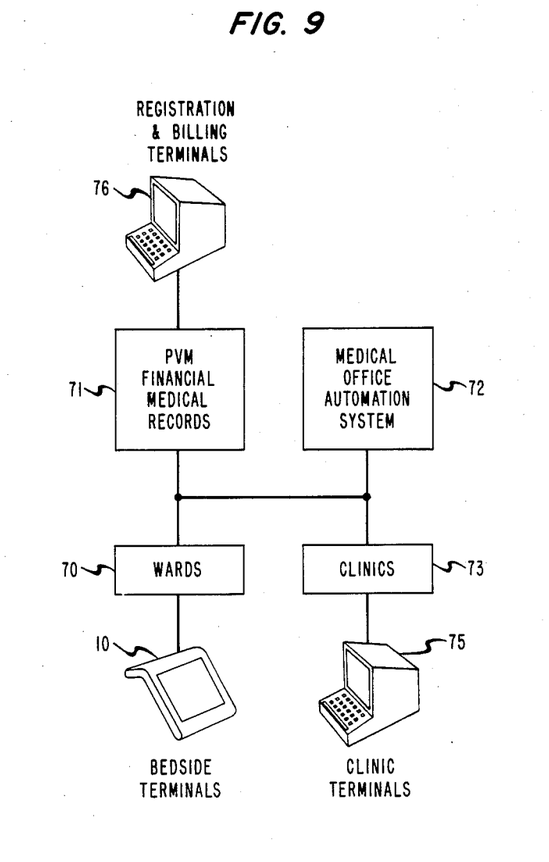
FIG. 9 is a block diagram of one application of a computer system in which the terminal of FIGS. 1 through 6 might be a part.

One particular application of terminal 10 is shown in FIG. 9. In FIG. 9, the terminal 10 is used as a bedside terminal in a hospital patient's room. Thus, a terminal similar to terminal 10 is available for each patient's bed in the hospital and is used much like the clipboard currently maintained manually for each patient's records. The bedside terminals 10 for each of the wards 70 are connected to medium-sized computers, each one servicing one of the wards in the hospital. These mini-computers, in turn, are connected, via communication path 74, to larger computers 71 and 72 which include financial and medical records for each of the patients (in computer 71) or hospital inventory and diagnostic tools available in another computer 72. A plurality of clinics 73 also associated with the hospital are likewise connected to backbone communication path 74, and communicate with standard computer terminals 75 to enter outpatient data into mini-computers servicing each of the clinics 73. Standard computer terminals 76 serve as input and output devices for computer 71 to permit patient registration, billing and other financial and administrative functions. Other hospital sub-systems, such as laboratories, pharmaceutical dispensories, visitors desks, and so forth, may be connected to the same computer system. The bedside terminals 10 therefore have access to all of the data generated and stored in these other sub-systems, as well as the computing power of the large mainframe computers 71 and 72.

The system illustrated in FIG. 9 might well also comprise a factory in which terminals 10 are used at the various workstations while the other sub-systems encompass functions such as inventory, new orders for output, purchasing, and so forth. The small size and rugged design of terminals 10 would serve extremely well in such an environment as well as the hospital room.

What is claimed is:

1. A terminal comprising
   a touch-sensitive electroluminescent display surface for simultaneously displaying information and for accepting input information through a touch-responsive area in said display surface, and
   means for coupling said surface to a digital computer for controlling said displaying and for storing and processing said input information, and including means for defining in said touch responsive area an essentially arbitrary pattern A of primary information subareas of said touch-responsive area for providing information, with each defined subarea developing a preselected signal for said computer when touched, a subarea B for recalling a previously displayed pattern of primary information subareas, and subareas C for calling up for display preselected other patterns of primary information subareas.

2. The terminal of claim 1 wherein said subarea B and subareas C direct said computer to carry out the respective functions when touched.

3. A method of simulating a typewriting keyboard on a touch-sensitive display surface comprising the steps of:
   (a) displaying a typewriter keyboard arrangement on said display surface,
   (b) responding to the touching of any of the key areas of said keyboard display by generating the electric code corresponding to the character assigned to the touched key area, and
   (c) altering the labels on the key areas in response to the touching of a special key area corresponding to a shift or control key to assign different electric codes to these key areas corresponding to the altered labels.

4. A terminal comprising:
   a touch-sensitive plasma display surface for simultaneously displaying information and for accepting input information through a touch-responsive area in said display surface, and
   means for coupling said surface to a digital computer for controlling said displaying and for storing and processing said input information, and including means for defining in said touch responsive area (a) an essentially arbitrary pattern of primary information subareas of said touch-responsive area for providing informatin, with each defined subarea developing a preselected signal for said computer when touched, (b) a subarea for recalling a previously displayed pattern of primary information subareas, and (c) subareas for calling up for display preselected other patterns of primary information subareas.

* * * * *